(12) United States Patent
Omiya

(10) Patent No.: US 9,105,136 B2
(45) Date of Patent: Aug. 11, 2015

(54) DISPLAY CONTROLLER, DISPLAY CONTROL METHOD AND COMPUTER-READABLE MEDIUM

(71) Applicant: P&W Solutions Co., Ltd., Tokyo (JP)

(72) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 113 days.

(21) Appl. No.: 13/950,824

(22) Filed: Jul. 25, 2013

(65) Prior Publication Data
US 2014/0028720 A1  Jan. 30, 2014

(30) Foreign Application Priority Data
Jul. 26, 2012  (JP) .................. 2012-165997

(51) Int. Cl.
*G09G 5/00*  (2006.01)
*G06T 11/60*  (2006.01)
*G06F 3/0482*  (2013.01)
*G06F 3/0483*  (2013.01)
*G06F 3/0485*  (2013.01)
*G06F 3/0488*  (2013.01)
*G06F 3/0481*  (2013.01)
*G06F 3/0484*  (2013.01)

(52) U.S. Cl.
CPC .............. *G06T 11/60* (2013.01); *G06F 3/0482* (2013.01); *G06F 3/0483* (2013.01); *G06F 3/0485* (2013.01); *G06F 3/04883* (2013.01); *G06F 3/0481* (2013.01); *G06F 3/04842* (2013.01); *G06F 2203/04805* (2013.01)

(58) Field of Classification Search
None
See application file for complete search history.

(56) References Cited

U.S. PATENT DOCUMENTS

| 6,253,218 | B1 * | 6/2001 | Aoki et al. ................ 715/201 |
| 2011/0084921 | A1 * | 4/2011 | Kang et al. ............... 345/173 |
| 2013/0145266 | A1 * | 6/2013 | Mantia et al. ............. 715/716 |

FOREIGN PATENT DOCUMENTS

JP  2009-140083 A  6/2009

* cited by examiner

*Primary Examiner* — Jwalant Amin
(74) *Attorney, Agent, or Firm* — SoCal IP Law Group LLP; Steven C. Sereboff; John E. Gunther

(57) ABSTRACT

To improve the visibility of a sequence of a plurality of images corresponding to a sequence of a plurality of pieces of information. According to the contents of a scroll operation, a display controller (1) displays to move each of a sequence of a plurality of card images (81 to 87) along a first direction and displays to move back and forth along a second direction. Furthermore, the display controller (1) determines a superimposing order for displaying each of a sequence of a plurality of the card images (81 to 87) according to a displacement of a display position of each of the sequence of the plurality of card images (81 to 87) in the second direction, and displays on a display unit (17) each of the sequence of a plurality of card images to be superimposed in accordance with the order.

6 Claims, 5 Drawing Sheets

FIG. 3

CONSECUTIVE INFORMATION STORAGE TABLE

| ID number | Name | ... |
|---|---|---|
| 0001 | Ichiro Aoki | ... |
| 0002 | Jiro Aoyama | ... |
| 0003 | Taro Igawa | ... |
| 0004 | Jiro Inoue | ... |
| 0005 | Ichiro Uno | ... |
| 0006 | Ichiro Edano | ... |
| 0007 | Taro Ogawa | ... |

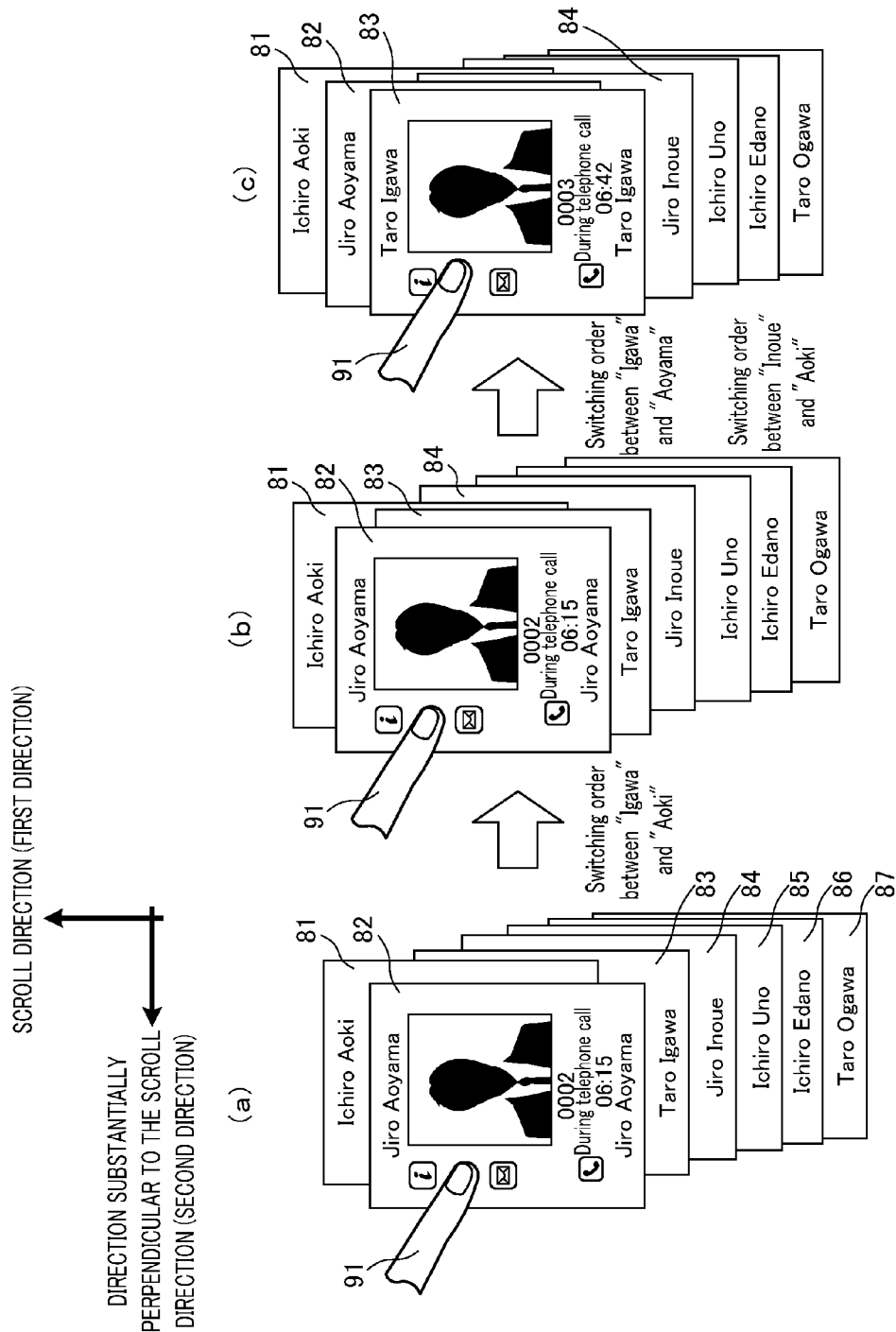

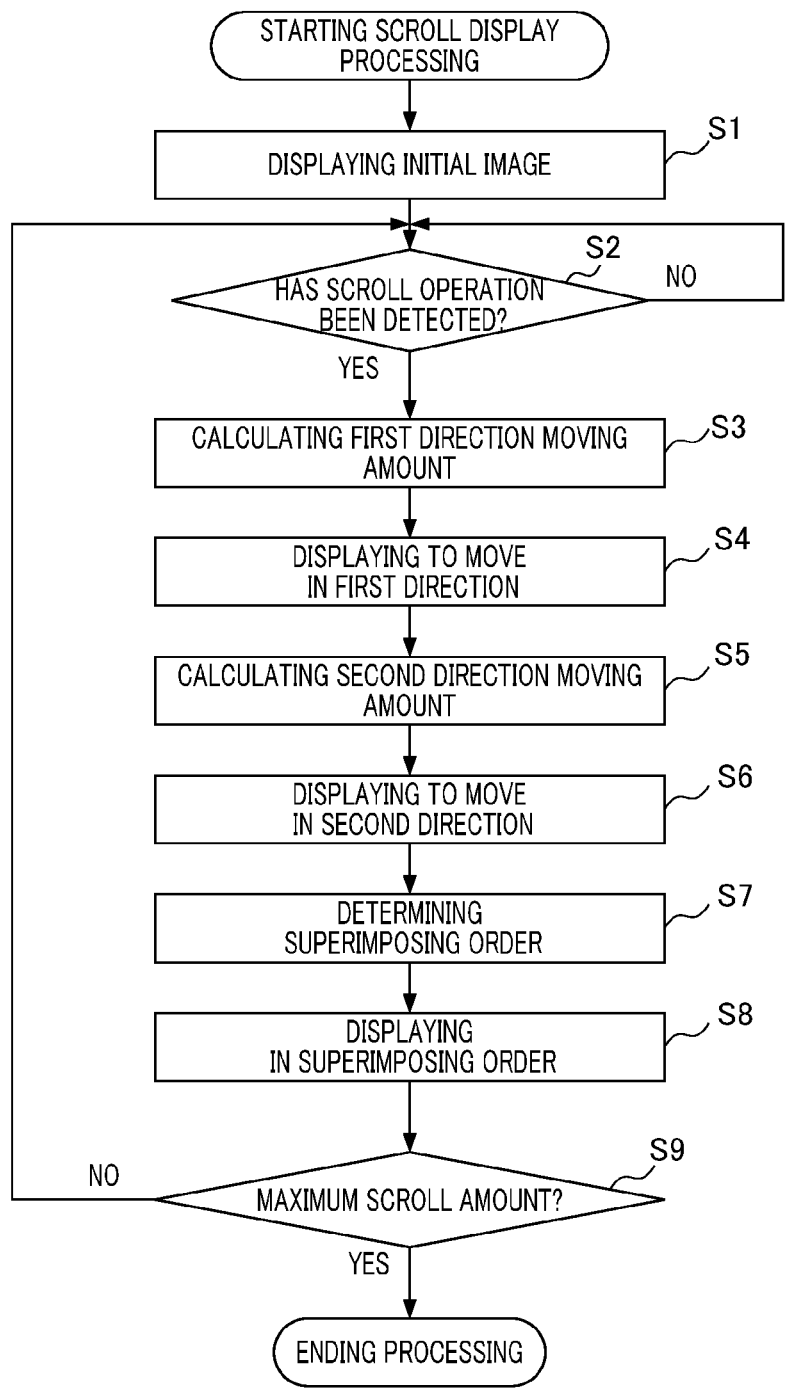

DISPLAY CONTROLLER, DISPLAY CONTROL METHOD AND COMPUTER-READABLE MEDIUM

This application is based on and claims the benefit of priority from Japanese Patent Application No. 2012-165997, filed on 26 Jul. 2012, the content of which is incorporated herein by reference.

BACKGROUND OF THE INVENTION

1. Field of the Invention

The present invention relates to a display controller, a display control method and a computer-readable medium.

2. Related Art

Conventionally, a display controller has been known in which a sequence of a plurality of images corresponding to a sequence of a plurality of pieces of information is scrolled to display to move, thereby improving the visibility (refer to Japanese Unexamined Patent Application, Publication No. 2009-140083).

SUMMARY OF THE INVENTION

The current situation can be exemplified by the desire for the further improvement in the visibility of a sequence of a plurality of images corresponding to a sequence of a plurality of pieces of information, than the display controller disclosed in Japanese Unexamined Patent Application, Publication No. 2009-140083.

The present invention addresses such a situation and has an object of improving the visibility of a sequence of a plurality of images corresponding to a sequence of a plurality of pieces of information.

In order to achieve the object, a display controller according to an aspect of the present invention includes: an initial image display control unit that sequentially superimposes, arranges in a first direction, and displays on a predetermined display device, a sequence of a plurality of images corresponding to each of a sequence of a plurality of pieces of information; a scroll operation receiving unit that receives a scroll operation in the first direction from a user; a first direction moving display control unit that displays to move, along the first direction on the display device, each of the sequence of the plurality of images displayed on the display device according to the control of the initial image display control unit, in response to the scroll operation received by the scroll operation receiving unit; a second direction moving display control unit that displays to move, back and forth in a second direction substantially perpendicular to the first direction on the display device, each of the sequence of the plurality of images displayed to move by way of the first direction moving display control unit; and a superimposing order determination unit that, according to a displacement in the second direction of a display position of each of the sequence of the plurality of images that is displayed to move on the display device according to the control of the first direction moving display control unit and the second direction moving display control unit, determines a superimposing order for each of the sequence of the plurality of images and displays on the display device each of the sequence of the plurality of images to be superimposed in accordance with the superimposing order.

According to the present invention, it is possible to improve the visibility of a sequence of a plurality of images corresponding to a sequence of a plurality of pieces of information.

BRIEF DESCRIPTION OF THE DRAWINGS

FIG. 3 is a diagram showing an example of a consecutive information storage table;

FIG. 4 is a schematic diagram showing an example of a display unit in scroll display processing; and FIG. 5 is a flowchart illustrating a flow of scroll display processing executed by the display controller of FIG. 1 having the functional configuration of FIG. 2.

DETAILED DESCRIPTION OF THE INVENTION

Descriptions of embodiments of the present invention are hereafter provided with reference to the drawings.

Figure 1:
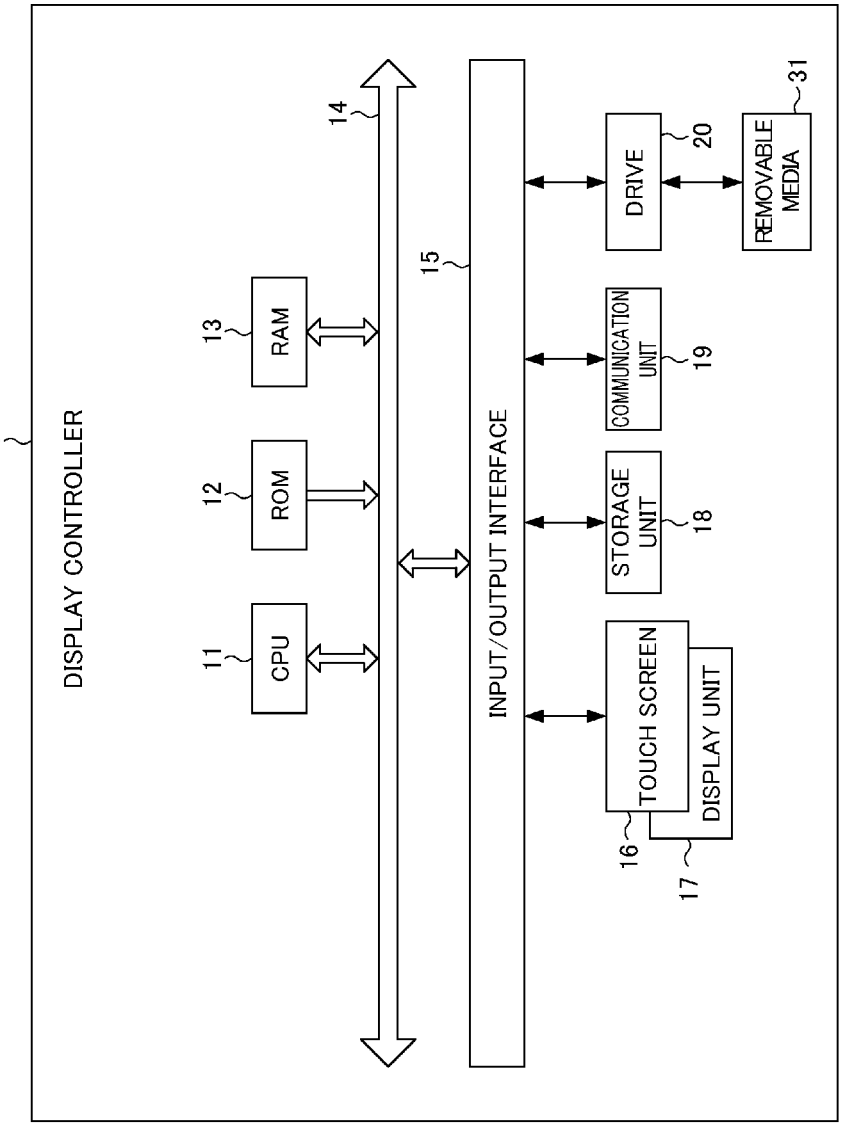
FIG. 1 is a block diagram showing a hardware configuration of a display controller of an embodiment of the present invention.

FIG. 1 is a block diagram showing a hardware configuration of a display controller of an embodiment of the present invention.

The display controller 1 includes: a CPU (Central Processing Unit) 11, ROM (Read Only Memory) 12, RAM (Random Access Memory) 13, a bus 14, an input/output interface 15, a touch screen 16, a display unit 17, a storage unit 18, a communication unit 19, and a drive 20.

The CPU 11 executes various types of processing in accordance with programs recorded in the ROM 12 or programs loaded into the RAM 13 from the storage unit 18.

The RAM 13 appropriately stores data, etc. required for the CPU 11 to execute various types of processing.

The CPU 11, the ROM 12 and the RAM 13 are mutually connected via the bus 4. The input/output interface 15 is also connected to the bus 14. The touch screen 16, the display unit 17, the storage unit 18, the communication unit 19 and the drive 20 are connected to the input/output interface 15.

The touch screen 16 is configured to include a capacitive or resistive touch screen that is laminated on a display screen of the display unit 17, and the touch screen detects coordinates of a position where a touch operation is performed. In this regard, the touch operation refers to an operation of an object (a finger or stylus of a user) to touch or approach the touch screen.

The display unit 17 is configured by a display device to display images.

The storage unit 18 is configured by a hard disk or DRAM (Dynamic Random Access Memory), and stores data of various images.

The communication unit 19 controls communication with other devices (not shown) via networks including the Internet.

A removable medium 31 is mounted to the drive 20 as appropriate. The removable medium 31 is composed of a magnetic disk, an optical disk, a magneto-optical disk, semiconductor memory, or the like. The drive 20 reads a program(s) from the removable medium 31. The program(s) is installed in the storage unit 18 as necessary. Similar to the storage unit 18, the removable medium 31 can also store a variety of data such as image data stored in the storage unit 18.

Figure 2:
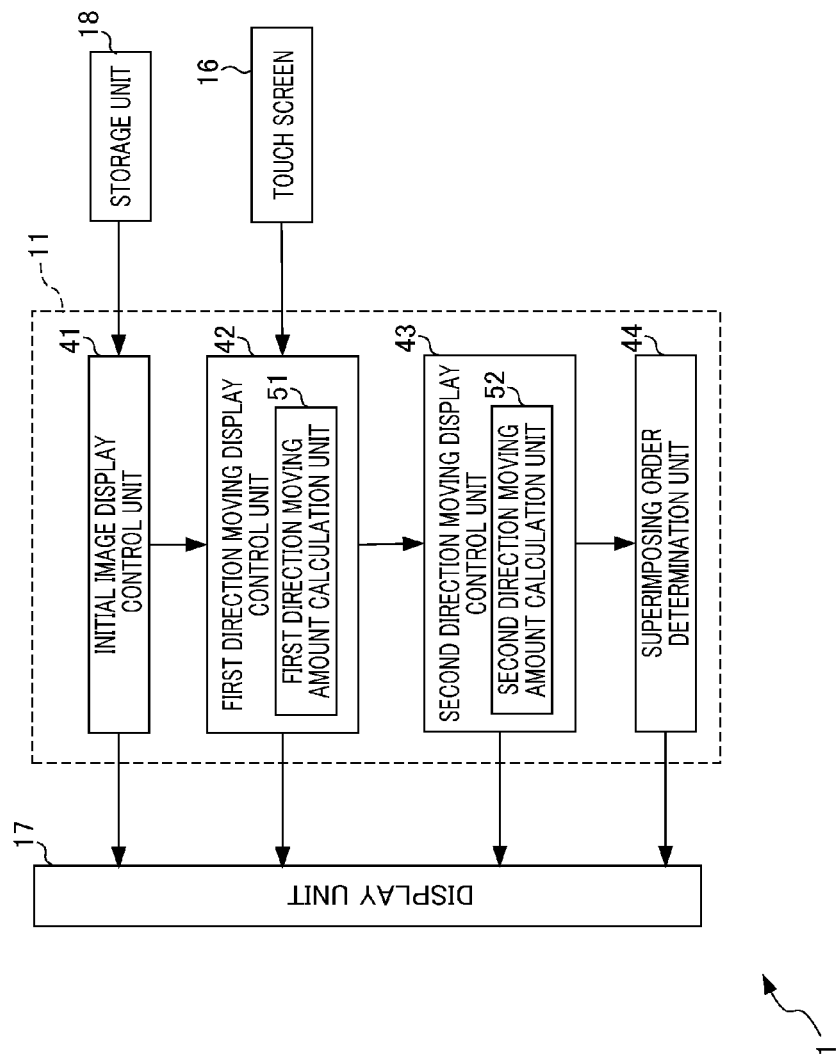
FIG. 2 is a functional block diagram showing a functional configuration for executing such scroll display processing among functional configurations of the display controller 1.

FIG. 2 is a functional block diagram showing a functional configuration for executing such scroll display processing among functional configurations of the display controller 1.

The scroll display processing refers to processing of: scrolling in a predetermined direction each of a sequence of a plurality of images displayed to be sequentially superimposed and arranged in a predetermined direction (hereinafter, referred to as "first direction") and displaying to move; and displaying to move the plurality of images back and forth in a direction substantially perpendicular to the predetermined direction (hereinafter, referred to as "second direction"). In this way, when focusing on a predetermined single image among the sequence of a plurality of images, the predetermined single image is displayed to move so as to roughly depict a substantially elbow shape or substantially an arc.

Furthermore, in the scroll display processing, each of the sequence of a plurality of images is displayed such that the superimposing order of an image gets higher for images having larger displacement in the second direction. Here, the displacement in the second direction refers to an amount indicating how much each of the sequence of a plurality of images is displaced and displayed toward the second direction, relative to a predetermined reference point on a display surface of the display unit 17 on which a sequence of a plurality of images is displayed.

In a case in which the execution of the scroll display processing is controlled, an initial image display control unit 41, a first direction moving display control unit 42, a second direction moving display control unit 43, and a superimposing order determination unit 44 function in the CPU 11. Furthermore, a first direction moving amount calculation unit 51 functions in the first direction moving display control unit 42. Furthermore, a second direction moving amount calculation unit 52 functions in the second direction moving display control unit 43.

It should be noted that the matter of the initial image display control unit 41 to the second direction moving display control unit 43 functioning in the CPU 11 is merely an example. In other words, at least some of the functions of the initial image display control unit 41 to the second direction moving display control unit 43 can also be assigned to components other than the CPU 11 (for example, a special purpose processor for image processing, etc. (not shown)).

When the scroll display processing starts, the initial image display control unit 41 acquires a sequence of information from a consecutive information storage table (refer to FIG. 3) stored in the storage unit 18. Here, the consecutive information storage table refers to a table in which a sequence of a plurality of pieces of information is stored which is a basis for a sequence of a plurality of images displayed on the display unit 17.

In the example of FIG. 3, the consecutive information storage table is configured so that each item such as ID number and name is associated with each other.

In the consecutive information storage table, a predetermined single row corresponds to a predetermined person. In other words, in the consecutive information storage table, each piece of personal information of a plurality of persons belonging to a predetermined group is stored in each single line.

More specifically, "0001" is attached in advance as an ID number to a person associated with the first line. Therefore, the ID number "0001", the person's name "Ichiro Aoki", and personal information of this person are associated with each other and stored in the first line. The same applies to the ID numbers "0002" to "0007".

The initial image display control unit 41 acquires each piece of information of the ID numbers "0001" to "0007" from the consecutive information storage table as a sequence of a plurality of pieces of information.

Then, the initial image display control unit 41 generates data of a plurality of card-like images (hereinafter, referred to as "card image") in which each of a sequence of a plurality of pieces of information acquired, and displays a sequence of the plurality of card images on the display unit 17 so as to be layered in a predetermined order.

A specific example of displaying a sequence of a plurality of card images is shown in FIG. 4(a) in which a card image 81 corresponding to "Ichiro Aoki", a card image 82 corresponding to "Jiro Aoyama", a card image 83 corresponding to "Taro Inoue", a card image 84 corresponding to "Jiro Inoue", a card image 85 corresponding to "Ichiro Uno", a card image 86 corresponding to "Ichiro Edano", and a card image 87 corresponding to "Taro Ogawa" are superimposed and arranged in a scroll direction (hereinafter, referred to as "first direction") to be displayed. It should be noted that the display size (resolution) is the same among the card images 81 to 87. In other words, the shape of the card images 81 to 87 is substantially rectangular and the lengths in horizontal and vertical directions (i.e. dimensions) are constant.

Furthermore, when scrolling to move each of the card images 81 to 87, it is displaced in a direction substantially perpendicular to the direction of scrolling (hereinafter, referred to as "second direction") to be displayed. Here, among the card images 81 to 87, the card images are displayed such that the superimposing order of an image gets higher for an image having larger the displacement in the second direction.

In the example of FIG. 4(a), since the displacement in the second direction of the card image 82 is the largest, the superimposing order of the card image 82 becomes the first, and the card image 82 is displayed on the top. Similarly, for the other card images, the superimposed order sets higher order in the order of larger displacement in the second direction, and the other images are displayed to be superimposed in this order.

Furthermore, "name" is displayed on both an upper end and lower end on each of the card images 81 to 87. With such an arrangement of displaying the name on both ends, it is possible for a user to visually recognize a name corresponding to each of the card images 81 to 87 easily no matter what order the superimposed order of each of the card images 81 to 87 is.

When the initial image display control unit 41 displays a sequence of the plurality of card images 81 to 87, the first direction moving display control unit 42 detects a scroll operation based on a temporal transition of a location of a user's touch operation on the touch screen 16 (touch location on the touch screen 16) and controls the display to move each of the card images 81 to 87 in the first direction.

More specifically, the first direction moving display control unit 42 causes the first direction moving amount calculation unit 51 to function. The first direction moving amount calculation unit 51 extracts a first direction component of the scroll operation and, based on the first direction component thus extracted, calculates a moving amount of each of the card images 81 to 87 in the first direction. It should be noted that each of the moving amounts of the card images 81 to 87 in the first direction is calculated uniformly.

Then, the first direction moving display control unit 42 displays to move each of the card images 81 to 87 in the first direction by the moving amount on the display unit 17.

While each of the card images 81 to 87 is displayed to move by the first direction moving display control unit 42, the second direction moving display control unit 43 controls to display to move each of the card images 81 to 87 in the second direction. More specifically, the second direction moving display control unit 43 causes the second direction moving amount calculation unit 52 to function. The second direction moving amount calculation unit 52 calculates a moving amount of each of the card images 81 to 87 in the second direction based on the moving amount of each of the card images 81 to 87 in the first direction component calculated by the first direction moving amount calculation unit 51.

For example, when explaining with reference to FIG. 4(*a*), in the case of assuming that the card image 82 that is displayed on the top (i.e. the order in the superimposition is the first) is set as a reference image, for each of the card images 83 to 87 displayed on a side in a direction opposite to the first direction with respect to the reference image, the moving amounts are calculated so as to display to move in the second direction. On the other hand, for the card image 82 as the reference image and the card image 81 that is displayed on a side in the first direction with respect to the reference image, the moving amounts are calculated so as to display to move on a side in a direction opposite to the second direction.

In other words, assuming that the second direction is a positive direction, when viewed from the reference image (the card image 82), the moving amounts in the positive direction are calculated for the card images 83 to 87 on the side in the direction opposite to the first direction, and the moving amount in a negative direction is calculated for the card image 81 on the side in the first direction.

Then, the second direction moving display control unit 43 displays to move each of the card images 81 to 87 in the second direction or the opposite direction by this moving amount on the display unit 17.

When each of the card images 81 to 87 is displayed to move in the second direction by the second direction moving display control unit 43, the superimposing order determination unit 44 determines the superimposing order for each of the card images 81 to 87 based on the displacement of each of the card images 81 to 87 in the second direction. More specifically, the superimposing order determination unit 44 determines the superimposing order of each of the card images 81 to 87 such that the superimposing order of an image gets higher as the displacement in the second direction becomes larger.

Furthermore, the superimposing order determination unit 44 displays each of the card images 81 to 87 on the display unit 17 so as to be superimposed in the superimposing order thus determined.

As described above, with the first direction moving display control unit 42, the second direction moving display control unit 43, and the superimposing order determination unit 44, each of the card images 81 to 87 are displayed to move so as to roughly depict a substantially elbow shape or a substantially arc. Furthermore, each of the card images 81 to 87 is displayed such that the superimposing order gets higher as the displacement in the second direction becomes larger. Therefore, since a card image for which the displacement in the second direction is the greatest is displayed on the top, the visibility of an image corresponding to information that should be given focus is improved.

Furthermore, the display size (resolution) is the same among the card images 81 to 87. Therefore, since a scroll display is performed on each of the card images 81 to 87 in such a way of touching actual cards, for example, the visibility of an image corresponding to information that should be given focus is improved without the display size being changed.

With reference to FIG. 4, a specific example of displaying to move of the card images 81 to 87 is described here.

In FIG. 4(*a*), an operation of moving a location of a user's touch operation on the touch screen 16 (touch location of a finger 91 on the touch screen 16) to a side in the first direction, i.e. the scroll operation, is executed, the card images 81 and 82 are displayed to move in the first direction and displayed to move onto a side in a direction opposite to the second direction. Furthermore, the card images 83 to 87 are displayed to move in the first direction and displayed to move in the second direction.

During this, as shown in FIG. 4(*b*), the displacement of the card image 83 in the second direction becomes larger than the displacement of the card image 81 in the second direction, and the superimposing order is set to the order of the card image 83, the card image 81; therefore, the card image 83 is displayed so as to be superimposed on the card image 81.

Furthermore, when the scroll operation to the side in the first direction is executed, as shown in FIG. 4(*c*), the displacement of the card image 83 in the second direction becomes larger than the displacement of the card image 82 in the second direction. Thus, since the superimposing order of the card image 83 becomes the top, the card image 83 is displayed on the top. Furthermore, since the displacement of the card image 84 in the second direction becomes greater than the displacement of the card image 81 in the second direction and the superimposing order is set to the order of the card image 84, the card image 81; therefore, the card image 84 is displayed so as to be superimposed on the card image 81.

Next, with reference to FIG. 5, scroll display processing executed by the display controller 1 having a functional configuration like FIG. 2 is described.

FIG. 5 is a flowchart illustrating a flow of scroll display processing executed by the display controller 1 of FIG. 1 having the functional configuration of FIG. 2.

The scroll display processing starts with a predetermined operation of instructing to start the scroll display processing from among the touch operations on the touch screen 16 by a user.

In Step S1, the initial image display control unit 41 acquires a sequence of a plurality of pieces of information from the consecutive information storage table stored in the storage unit 18, generates data of a sequence of a plurality of card images (the card images 81 to 87 in the abovementioned example of FIG. 4) based on the sequence of the plurality of pieces of information, and superimposes each of the sequence of the plurality of card images with a default order to display on the display unit 17. In a case in which the data of the card images 81 to 87 of the example of FIG. 4 is generated as data of a sequence of a plurality of card images, the display mode of the card images 81 to 87 is as shown in FIG. 4(*a*).

In Step S2, the first direction moving display control unit 42 determines whether a user's scroll operation on the touch screen 16 was detected. In a case in which a scroll operation has not been made, a NO determination is made in Step S2, and the first direction moving display control unit 42 returns the processing back to Step S2. Therefore, until a scroll operation is made, the first direction moving display control unit 42 sets the scroll display processing to a standby state by repeating the processing of determining in Step S2.

On the other hand, in a case in which the scroll operation has been made, a YES determination is made in Step S2 and the processing advances to Step S3.

In Step S3, the first direction moving amount calculation unit 51 extracts a first direction component of the scroll operation detected in Step S2 and, based on the first direction component thus extracted, calculates a moving amount of each of the sequence of the plurality of card images in the first direction.

In Step S4, the first direction moving display control unit 42 displays to move the card images 81 to 87 in the first direction by the moving amount on the display unit 17.

In Step S5, the second direction moving amount calculation unit 52 calculates a moving amount of the card images 81 to 87 in the second direction or the opposite direction based on the moving amount of the card images 81 to 87 in the first direction component calculated by the first direction moving amount calculation unit 51.

In Step S6, the second direction moving display control unit 43 displays to move the card images 81 to 87 in the second direction or the opposite direction by the moving amount on the display unit 17.

It should be noted that, although the processing of displaying to move in the second direction (Steps S5 and S6) is executed after the processing of displaying to move in the first direction (Steps S3 and S4) for the purpose of convenience for description, the order of processing is not particularly limited. In other words, since the processing of displaying to move in the first direction (Step S3 and S4) and the processing of displaying to move in the second direction (Step S5 and S6) are actually executed independently in a parallel manner, the order of processing is not particularly limited.

In Step S7, the superimposing order determination unit 44 determines the superimposing order for each of a sequence of a plurality of card images based on the displacement of each of the sequence of the plurality of card images in the second direction after the processing of displaying to move in Step S6.

In Step S8, the superimposing order determination unit 44 superimposes a sequence of a plurality of card images with the superimposing order thus determined and displays on the display unit 17.

In Step S9, the first direction moving display control unit 42 determines whether the displacement of a sequence of a plurality of card images in the first direction has reached a predetermined amount (maximum scroll amount). In other words, the first direction moving display control unit 42 determines whether a sequence of a plurality of card images moves in the first direction up to the maximum.

In a case of the displacement in the first direction not reaching the maximum scroll amount, a NO determination is made in Step S9 and the processing returns back to Step S2 and the processing thereafter repeats. In other words, until the displacement in the first direction reaches the maximum scroll amount, the loop processing from Steps S2 to S9 is executed repetitively.

On the other hand, in a case in which the displacement in the first direction has reached the maximum scroll amount, a YES determination is made in Step S9 and the scroll display processing ends.

As described above, with the combination of the processing of displaying to move in the first direction (Steps S3 and S4) and the processing of displaying to move in the second direction (Steps S5 and S6), each of a sequence of a plurality of the card images (the card images 81 to 87 in the example of FIG. 4) is displayed to move so as to roughly depict a substantially elbow shape or a substantially arc. Furthermore, with Steps S7 and S8, a sequence of a plurality of card images is displayed such that the superimposing order gets higher as the displacement in the second direction becomes larger, and the images are superimposed and displayed in the superimposing order.

It should be noted that, in the present embodiment, the scroll display processing is executed by script processing based on Web HTML. In this way, the scroll display processing is executed with high speed.

As described above, according to the present embodiment, the display controller 1 displays to move each of a sequence of a plurality of card images (the card images 81 to 87 in the example of FIG. 4) along the first direction according to the contents of the scroll operation and displays to move back and forth along the second direction. Furthermore, the display controller 1 determines the superimposing order for displaying each of a sequence of a plurality of card images according to the displacement of a display position of each of a sequence of a plurality of card images in the second direction and superimposes each of the sequence of the plurality of card images in the order thus determined to display the images on the display unit 17. In this way, each of a sequence of a plurality of card images is displayed to move so as to roughly depict a substantially elbow shape or a substantially arc shape, and the order of superimposing the sequence of a plurality of card images is determined according to the displacement of the image in the second direction and each of the sequence of the plurality of card images is superimposed according to the order to be displayed on the display unit 17. In this way, it is possible to improve the visibility of a sequence of a plurality of card images corresponding to a sequence of a plurality of pieces of information.

Furthermore, the display controller 1 displays each of a sequence of a plurality of card images such that the superimposing order of a display position of an image gets higher as the displacement in the second direction becomes larger. Therefore, each of a sequence of a plurality of card images is displayed to move so as to roughly depict a substantially elbow shape or a substantially arc shape, and it is configured so that an image for which the displacement in the second direction is the maximum is displayed on the top. In this way, the visibility of an image corresponding to information that should be given focus is improved.

Furthermore, in the display controller 1, the display size (resolution) of each of a plurality of card images are the same. Therefore, the visibility of an image corresponding to information that should be given focus is improved even if the display size of a plurality of card images does not change dynamically.

Although embodiments of the present invention have been described above, the present invention is not limited to the abovementioned embodiments. In addition, the effects described in the embodiments are merely listed as the most preferred effects arising from the present invention, and the effects according to the present invention are not limited to those described in the embodiment of the present invention.

Although, in the present embodiment, the first direction moving display control unit 42 detects the user's scroll operation on the touch screen 16, the present invention is not limited thereto. For example, the first direction moving display control unit 42 may detect a user's scroll operation from a mouse by applying the mouse as an input unit.

Although, in the present embodiment, the first direction moving display control unit 42 displays to move the card images 81 to 87 in the first direction only, the present invention may display to move in a direction opposite to the first direction.

In addition, in the present embodiment, although the first direction moving display control unit 42 and the like control to display the seven images of the card images 81 to 87, the present invention is not limited thereto, and the present invention may display no more than six images or no less than eight images.

Furthermore, in the abovementioned embodiments, the display controller 1 in which the present invention is applied has been described with a touch screen tablet as an example; however, the present invention is not particularly limited thereto.

For example, the present invention can be applied to electronic devices having a display function in general. More specifically, for example, the present invention can be applied to a laptop personal computer, a television receiver, a video camera, a portable navigation device, a cellular telephone device, a portable gaming machine, etc.

The sequence of processing described above can be executed by hardware and/or software.

In other words, the functional configuration shown in FIG. 2 is merely an exemplification, and is not limited thereto in particular. In other words, it is sufficient for the display controller 1 to include a function capable of executing the aforementioned sequence of processing as a whole, and which functional block should be used to implement the function is not particularly limited to the example shown in FIG. 2.

A single functional block may be configured by a single piece of hardware, a single piece of software, or a combination thereof.

In a case in which a sequence of processing is executed by software, a program configuring the software is installed from a network or a recording medium into a computer, etc.

The computer may be a computer incorporated into specialized hardware. The computer may be a computer such as a general-purpose personal computer capable of executing various functions by installing various programs.

The storage medium containing such a program is not only configured by the removable medium 31 shown in FIG. 1 distributed separately from the device main body for supplying the program to the user, but may also be configured by a storage medium or the like provided to the user in a state incorporated in the device main body in advance. The removable medium 31 is configured by, for example, a magnetic disk (including a floppy disk), an optical disk, a magnetic optical disk, or the like. The optical disk is configured by, for example, a CD-ROM (Compact Disk-Read Only Memory), a DVD (Digital Versatile Disk), or the like. The magnetic optical disk is configured by an MD (Mini-Disk) or the like. The storage medium provided to the user in a state incorporated in the device main body in advance is configured by, for example, the ROM 12 shown in FIG. 1, a hard disk included in the storage unit 18 shown in FIG. 1 or the like, in which the program is recorded.

In the present specification, the steps describing the program recorded in the storage medium include not only the processing executed in a time series following this order, but also processing executed in parallel or individually, which is not necessarily executed in a time series.

Furthermore, in the present specification, system terminology represents general devices configured by a plurality of devices, a plurality of instruments, or the like.

Although some embodiments of the present invention have been described above, the embodiments are merely examples, and do not limit the technical scope of the present invention. Other various embodiments can be employed for the present invention, and various modifications with omissions and replacements are possible within a scope that does not depart from the spirit of the present invention. Such embodiments and modifications are included in the scope of the invention and the summary described in the present specification, and are included in the invention recited in the claims as well as an equivalent scope thereof.

What is claimed is:

1. A display controller comprising:
  a processor;
  a memory coupled to the processor, the memory storing instructions that, when executed by the processor, cause the display controller to perform actions comprising:
    generating an initial display image including a plurality of card images, the plurality of card images partially superimposed and arranged in sequence along a first direction, the plurality of card images corresponding to a plurality of pieces of information;
    causing the initial display screen to be displayed on a display unit;
    receiving an input from a scroll input device indicating a scroll operation performed by a user and extracting a first direction component of the scroll operation to calculate a uniform amount of movement in the first direction for the plurality of card images,
    calculating an amount of movement in a second direction perpendicular to the first direction for the plurality of card images based on the uniform amount of movement in the first direction;
    generating a revised display screen wherein a position of each of the plurality of card images is displaced in the second direction in accordance with the amount of movement in the second direction and wherein a superimposition order of the plurality of images is determined based on a relative position of each card image in the second direction; and
    causing the revised display screen to be displayed on the display unit.

2. The display controller according to claim 1, wherein the superimposition order is determined such that a card image having a largest displacement in the second direction relative to the other card images is placed at the top of the superimposition order.

3. The display controller according to claim 1, wherein a display size on the display device is the same for each of the plurality of card images.

4. The display controller according to claim 1, wherein which of a positive direction and a negative direction of the second direction is assigned to the amount of movement of a certain card image of the plurality of card images is determined according to a position of the certain card image with respect to the first direction of a reference card image which is a topmost card image of the plurality of card images.

5. A method of controlling a display unit, comprising:
generating an initial display image including a plurality of card images, the plurality of card images partially superimposed and arranged in sequence along a first direction, the plurality of card images corresponding to a plurality of pieces of information;
causing the initial display screen to be displayed on the display unit;
receiving an input from a scroll input device indicating a scroll operation performed by a user and extracting a first direction component of the scroll operation to calculate a uniform amount of movement in the first direction for the plurality of card images,
calculating an amount of movement in a second direction perpendicular to the first direction for the plurality of card images based on the uniform amount of movement in the first direction;
generating a revised display screen wherein a position of each of the plurality of card images is displaced in the second direction in accordance with the amount of movement in the second direction and wherein a superimposition order of the plurality of images is determined based on the relative position of each card image in the second direction; and
causing the revised display screen to be displayed on the display unit.

6. A non-transitory computer-readable medium storing a display control program that, when exectued in a computing device, cause the computing device to perform actions including:
  generating an initial display image including a plurality of card images, the plurality of card images partially superimposed and arranged in sequence along a first direction, the plurality of card images corresponding to a plurality of pieces of information;
  causing the initial display screen to be displayed on a display unit;
  receiving an input from a scroll input device indicating a scroll operation performed by a user and extracting a first direction component of the scroll operation to calculate a uniform amount of movement in the first direction for the plurality of card images,
  calculating an amount of movement in a second direction perpendicular to the first direction for the plurality of card images based on the uniform amount of movement in the first direction;
  generating a revised display screen wherein a position of each of the plurality of card images is displaced in the second direction in accordance with the amount of movement in the second direction and wherein a superimposition order of the plurality of images is determined based on the relative position of each card image in the second direction; and
  causing the revised display screen to be displayed on the display unit.

* * * * *

UNITED STATES PATENT AND TRADEMARK OFFICE
CERTIFICATE OF CORRECTION

| | | |
|---|---|---|
| PATENT NO. | : 9,105,136 B2 | Page 1 of 1 |
| APPLICATION NO. | : 13/950824 | |
| DATED | : August 11, 2015 | |
| INVENTOR(S) | : Omiya | |

It is certified that error appears in the above-identified patent and that said Letters Patent is hereby corrected as shown below:

In the claims

Column 11, line 2, Claim 6: replace "exectued" with --executed--.

Signed and Sealed this
Twenty-second Day of December, 2015

Michelle K. Lee
*Director of the United States Patent and Trademark Office*